Sept. 5, 1967   W. W. SIEKANOWICZ ET AL   3,340,484
RECIPROCAL LATCHED FERRITE PHASE SHIFTER
Filed March 10, 1966   4 Sheets-Sheet 1

Inventors:
WIESLAW W. SIEKANOWICZ,
WILLIAM A. SCHILLING &
IRWIN BARDASH
BY
Edward J. Norton
Attorney

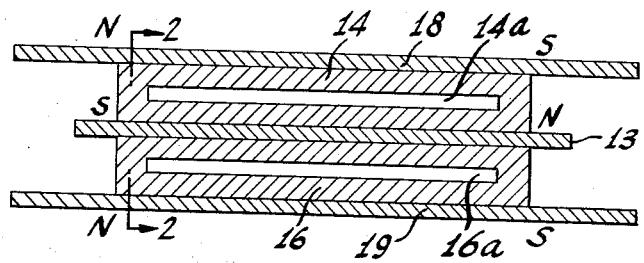
Fig. 3.
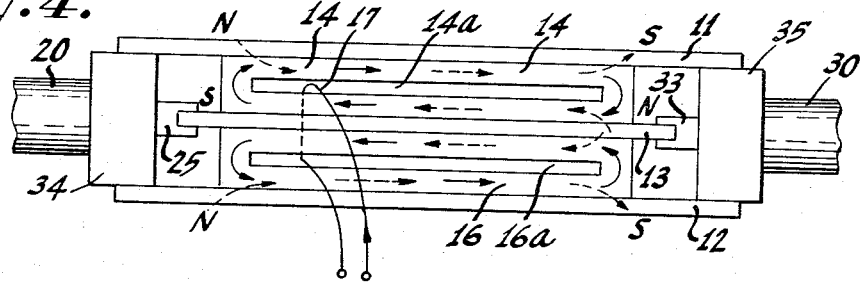
Fig. 4.
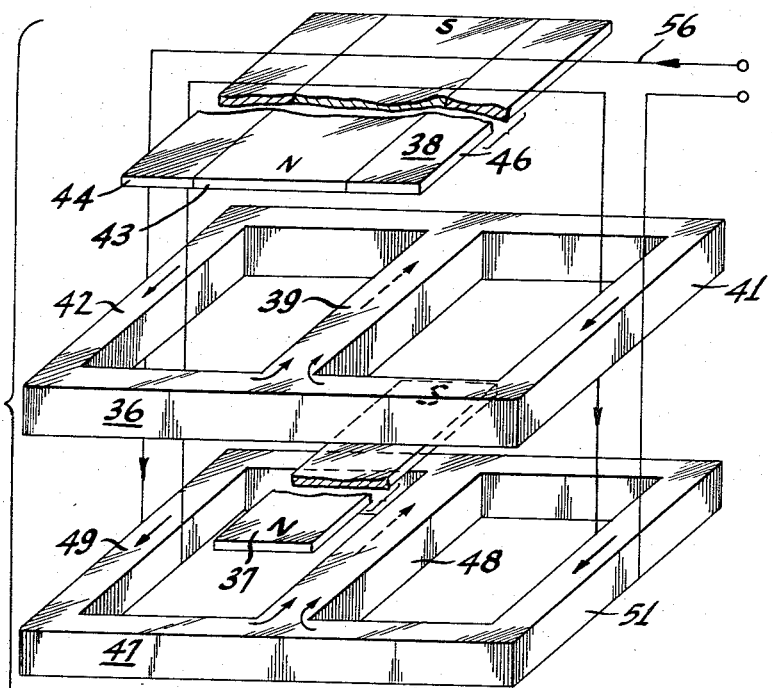
Fig. 5.
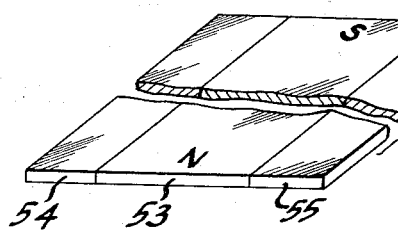
Inventors:
WIESLAW W. SIEKANOWICZ,
WILLIAM A. SCHILLING &
IRWIN BARDASH
BY
Edward J. Norton
Attorney

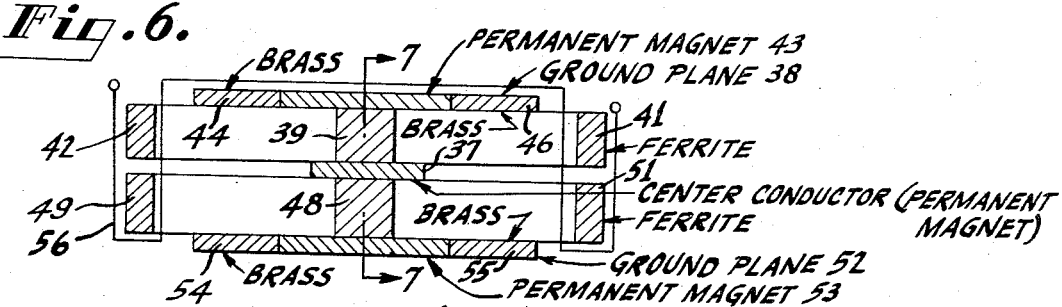
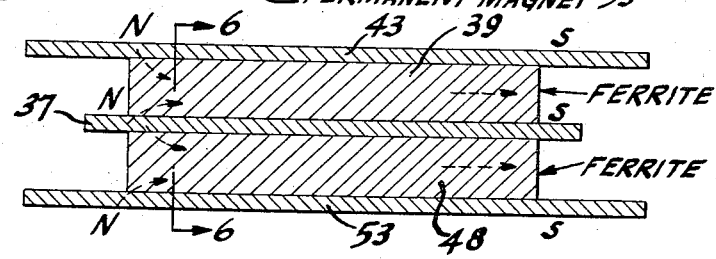
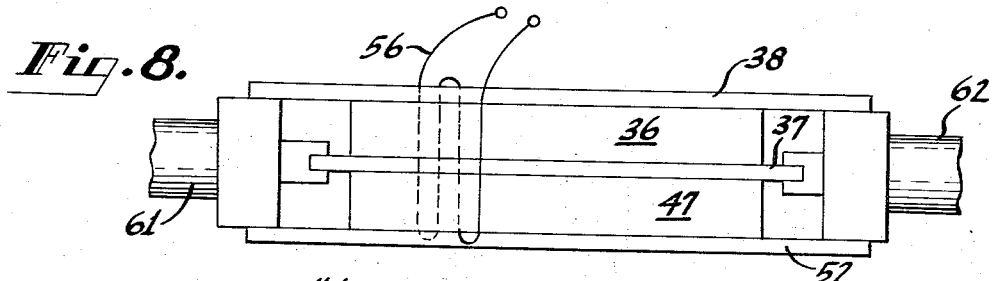
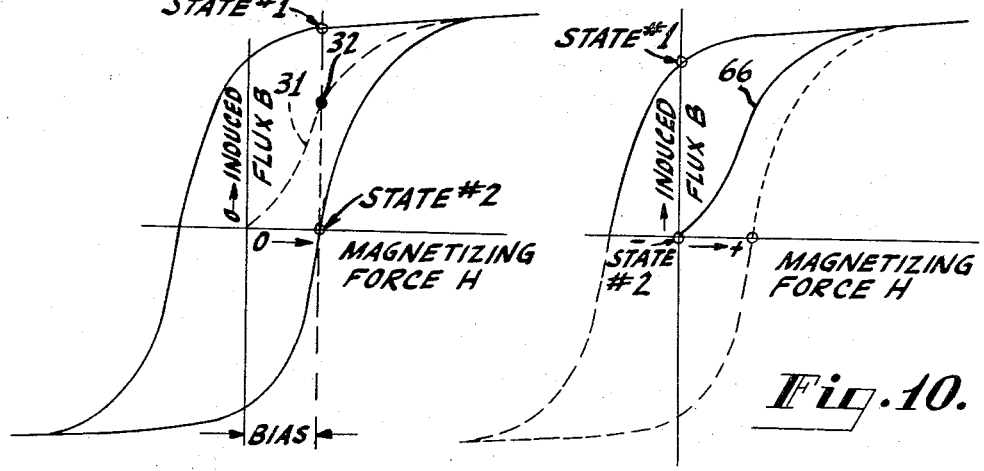
Fig. 9.
Fig. 10.
Inventors:
WIESLAW W. SIEKANOWICZ,
WILLIAM A. SCHILLING &
IRWIN BARDASH
BY Edward J. Norton
Attorney Sept. 5, 1967   W. W. SIEKANOWICZ ET AL   3,340,484
RECIPROCAL LATCHED FERRITE PHASE SHIFTER
Filed March 10, 1966   4 Sheets-Sheet 4

Inventors:
WIESLAW W. SIEKANOWICZ,
WILLIAM A. SCHILLING &
IRWIN BARDASH
BY
Edward J. Norton
Attorney

United States Patent Office 3,340,484
Patented Sept. 5, 1967

3,340,484
RECIPROCAL LATCHED FERRITE PHASE SHIFTER
Wieslaw W. Siekanowicz, Trenton, William A. Schilling, Hightstown, and Irwin Bardash, Willingboro, N.J., assignors to Radio Corporation of America, a corporation of Delaware
Filed Mar. 10, 1966, Ser. No. 533,299
5 Claims. (Cl. 333—31)

ABSTRACT OF THE DISCLOSURE

A ferrite phase shifter of the longitudinally magnetized type in which the ferrite has a closed magnetic path and is latched into a stable state by passing a pulse of current through a magnetizing loop. The phase shifter is switched into conduction for minimum phase shift by passing an opposite polarity current pulse through the magnetizing loop.

---

This invention relates to improved ferrite phase shifters, and particularly to improved ferrite phase shifters in which the ferrite is latched to a longitudinally magnetized state.

Reciprocal ferrite phase shifters in which the ferrite is longitudinally magnetized are known in the art. For example, a phase shifter of this type requiring an external magnet such as a permanent magnet or electromagnet for maintaining the internal D-C magnetic flux density in the ferrite required for phase shift operation is described in Microwave Ferrites and Ferrimagnetics by Lax and Button, published by McGraw-Hill Book Co., Inc.; note being made of the phase shifter shown on page 349 which comprises a thick slab of ferrite placed in the center of a rectangular waveguide.

An object of the invention is to provide an improved ferrite phase shifter.

A further object of the invention is to provide an improved ferrite phase shifter that can be manufactured at a comparatively low cost.

A further object of the invention is to provide an improved ferrite phase shifter of small size and light weight.

A still further object of the invention is to provide an improved reciprocal ferrite phase shifter having a magnetizing loop through which a current pulse of one polarity may be passed to latch the ferrite into a state of high induced flux density and through which a current pulse of the opposite polarity may next be passed to produce approximately zero induced flux in the ferrite.

In the preferred embodiment of our ferrite phase shifter a length of ferrite is positioned in and parallel to a transmission line, such as a waveguide or a strip transmission line, the ferrite, except for the end portions, having a transverse opening so that it is in the form of a toroid. A magnetizing coil or loop passes through this transverse opening so that when a pulse of current of a certain polarity is passed through it there is a flow of magnetic flux through the length of the ferrite, there being a closed magnetic path provided by the ferrite toroid, and the ferrite is latched into a stable magnetic state of high flux density upon termination of the current pulse. This latching of the ferrite provides the internal D-C magnetic flux density required for phase shift operation.

To put the phase shifter in condition for minimum phase shift, a pulse of current of the opposite polarity is passed through the magnetizing loop, the current having such amplitude that upon termination of the pulse the ferrite has approximately zero induced flux.

Our phase shifter may be operated either with or without a biasing magnetizing force applied to the ferrite. The phase shifter may be put into operation for producing the desired phase shift by passing a pulse of current through the magnetizing loop to drive the ferrite approximately to magnetic saturation so that upon termination of the pulse the ferrite is latched at remanence if no biasing magnetizing force is employed. The phase shifter may then be put into condition for minimum phase shift by passing a current pulse of opposite polarity through the magnetizing loop. In this case of no biasing, this current pulse is of such amplitude that the magnetizing force is approximately equal to the coercive force of the ferrite whereby the internal flux density of the ferrite is brought substantially to zero upon termination of the pulse.

When biasing is provided, the current pulse for latching the ferrite produces a magnetizing force in the same direction as the biasing. The magnetizing force of the biasing is made approximately equal to the coercive force of the ferrite. Upon termination of the pulse, the ferrite is latched at a flux density above remanence because of the presence of the biasing magnetizing force. With biasing present, the phase shifter is put in condition for minimum phase shift by passing a current pulse of opposite polarity through the magnetizing loop, the current pulse having sufficient amplitude to drive the ferrite approximately to magnetic saturation in the opposite direction. Upon termination of this opposite polarity pulse, the flux density of the ferrite is approximately zero.

The term "ferrite" as applied to our phase shifter defines a material which is insulating, magnetic, and has gyromagnetic properties. The material may be, for example, a cubic ferrite, a hexagonal ferrite, or a magnetic garnet.

The invention will be described in detail with reference to the accompanying drawing in which:

FIG. 3 is a cross-sectional view taken on the line 3—3 of FIG. 2 looking in the direction of the arrows;

FIG. 4 is a side view of the embodiment shown in FIGS. 1 to 3, inclusive;

FIG. 5 is an exploded view of an embodiment of the invention employing a ferrite body in the form of a double toroid;

FIG. 6 is a cross-sectional view of the embodiment of FIG. 5 taken on the line 6—6 of FIG. 7 looking in the direction of the arrows;

FIG. 7 is a cross-sectional view taken on the line 7—7 of FIG. 6;

FIG. 8 is a side view of the embodiment shown in FIGS. 5 to 7, inclusive;

FIG. 9 is a view which shows the hysteresis loop of a ferrite material which may be used in the invention, and which illustrates one method of operationg our phase shifter;

FIG. 10 is a view which shows the hysteresis loop of a suitable ferrite material, and which illustrates another method of operating our phase shifter;

In the several figures like parts are indicated by similar reference characters.

Figure 1:
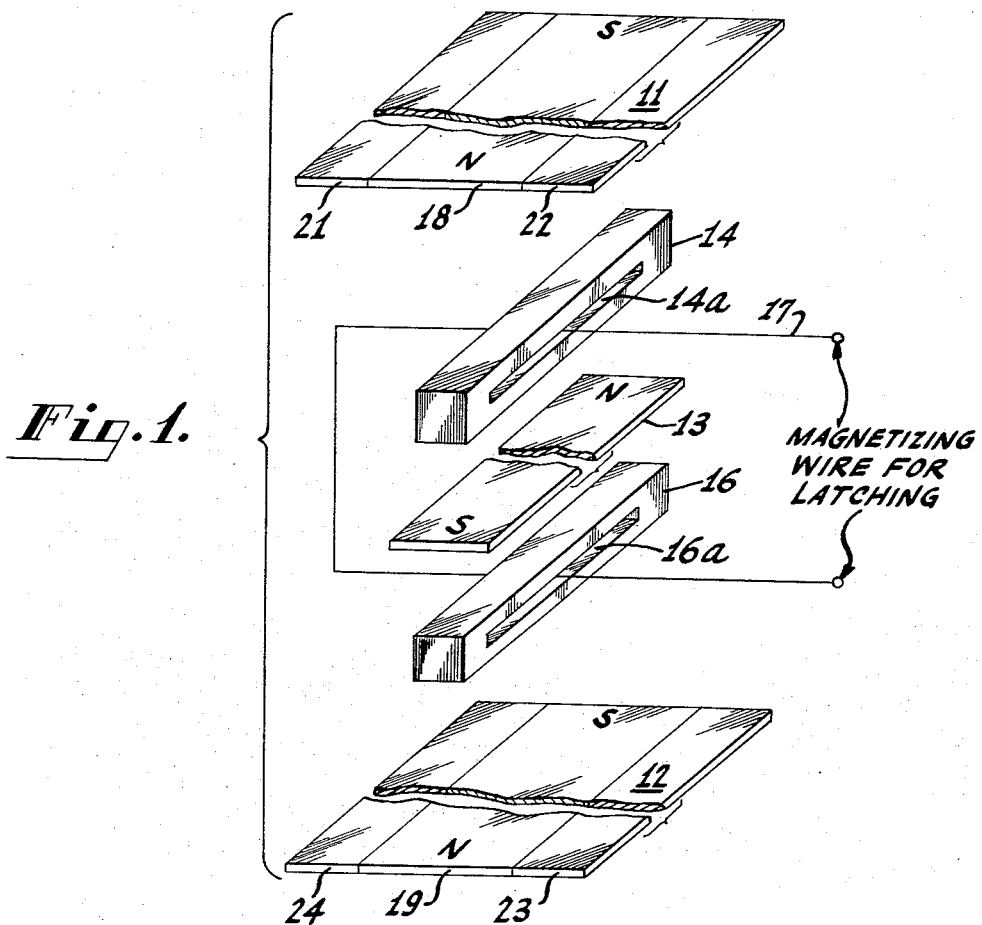
FIG. 1 is an exploded view of an embodiment of the invention employing a ferrite body in the form of a single toroid.
Figure 2:
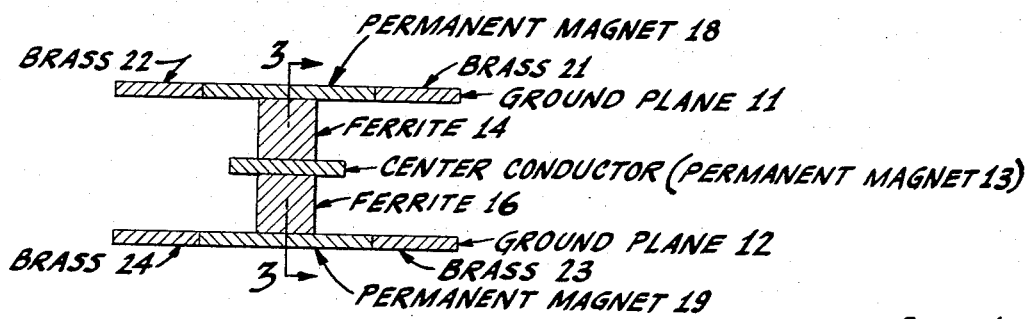
FIG. 2 is a cross-sectional view of the embodiment of FIG. 1 taken on the line 2—2 of FIG. 3 looking in the direction of the arrows.

Refer to FIGS. 1, 2, 3 and 4 which illustrate one embodiment of the invention. This embodiment comprises a single loop ferrite toroid positioned in a strip transmission line which has ground planes 11 and 12, and center conductor 13. A single loop ferrite toroid 14 is positioned between the center conductor 13 and the ground plane 11. A second similar ferrite toroid 16 is positioned between the center conductor 13 and the ground plane 12.

The term "strip transmission line" includes various transmission lines that propagate signal in the TEM mode. It includes, for example, various parallel plate transmission lines, whether or not dielectric material is used. The term "transmission line" used throughout the specification and claims includes the various known open nonconventional type transmission lines and closed type transmission lines.

Each of the toroids 14 and 16 consists of an elongated body of ferrite which has a slit or opening in it that has been cut (or molded in) transverse to the length of the ferrite body and through the entire width of the ferrite body. These openings are indicated at 14a and 16a in the body. It will be seen that the resulting ferrite bodies are toroids.

As shown in FIGS. 1 and 4 an electrical conductor 17 passes through the toroid 14 and returns through the toroid 16 to function as a magnetizing loop or coil. When current is passed through the magnetizing coil in a certain direction, magnetic flux flows through the ferrite toroids as indicated by the solid line arrows in FIG. 4. It is evident that for most of the length of the toroids this flux flow is longitudinal, that is, it is parallel to the direction of propagation of signal in the transmission line.

In the example illustrated, magnetic biasing is provided for the ferrite toroids by means of permanent magnets.

Permanent magnets 18 and 19 form the center portions of the upper and lower ground planes 11 and 12, respectively. The remainder of the ground plane 11 is formed by conducting strips 21 and 22 which may be of brass. The remainder of the ground plane 12 is formed by conducting strips 23 and 24 which may be of brass.

The center conductor 13 is a permanent magnet which may be silver plated to make it a good conductor at radio frequencies. The magnets in the ground planes likewise may be silver plated. The permanent magnets in this embodiment and in the next described embodiment should have a magnetic hardness sufficiently large so that the magnetic intensity of the switching current pulses will not affect their bias field magnitude.

The center conductor magnet 13 is positioned with its polarity opposite that of the magnets 18 and 19 in the ground planes as indicated by the letters N and S. Therefore, as indicated by the dotted line arrows in FIG. 4, the main return flux path for the magnet in the upper ground plane is through the upper part of toroid 14, the main return flux path for the magnet in the lower ground plane is through the lower part of toroid 16, and the main return flux path for the center conductor magnet 13 is through the lower part of toroid 14 and the upper part of toroid 16.

A current pulse through coil 17 for latching the ferrite toroids 14 and 16 to phase shifting condition produces a flow of magnetizing flux in the direction indicated by the solid line arrows. It will be seen that it is in the same direction as the biasing flux.

It will also be seen that the longitudinal flux flow in one leg of a toroid is in a direction opposite to the direction of flux flow in the other leg of the ferrite. It might appear that since the entire toroid is in the radio frequency interaction region, this would result in a cancellation of any phase shift action. This is not the case, however, because the phase shift action on a signal propagated down the line is identical whether the longitudinal magnetic flux flow is in one direction or the other.

The operation of the above-described embodiment is illustrated in FIG. 9 which shows the hysteresis loop for the ferrite toroids. The dotted line curve 31 is the "virgin curve" which is plotted from the original condition of the ferrite when it is not magnetized and no magnetizing force is being applied. With the bias magnetizing force applied by the permanent magnets, the induced flux in the ferrite has the value indicated at the point 32. The bias magnetizing force is made equal to, or approximately equal to, the coercive force of the ferrite, its value being typically one oersted, for example.

To put the phase shifter in condition for maximum phase shift, a current pulse is passed through the magnetizing coil of the phase shifter, this pulse being of a polarity to produce a magnetizing force in the same direction as that of bias magnetizing force. Typically, the amplitude of this current pulse is large enough to produce a magnetizing force of twenty oersteds, for example. This magnetizing force is usually more than sufficient to drive the ferrite substantially into magnetic saturation. Upon termination of the current pulse, the ferrite is latched to a stable magnetic state of high induced flux indicated by the point on the hysteresis loop marked state #1. The phase shifter will now produce the maximum phase shift. Since the theory of operation in producing the phase shift is the same as for the above-described prior art phase shifter, it need not be described here.

To put the phase shifter in condition for minimum phase shift, in which condition there will be a small phase shift due to the line characteristics with the ferrite acting only as a dielectric, a current pulse of opposite polarity is passed through the magnetizing coil of the phase shifter. This current pulse has an amplitude sufficient to drive the ferrite substantially into saturation in the opposite direction. It may be of the same amplitude as the other polarity pulse, that is, of an amplitude sufficient to produce a magnetizing force of twenty oersteds, for example.

Upon termination of this opposite polarity pulse, the induced flux of the ferrite goes to zero value as indicated by the point on the hysteresis loop marked state #2. Thus, upon the termination of the opposite polarity pulse, the induced flux goes from positive to negative. The magnetizing force applied by the permanent magnet which is approximately equal to the coercive force of the ferrite brings the ferrite to the zero value at point marked state #2.

When it is desired to again switch the phase shifter into maximum phase shifting condition, the first polarity current pulse is again passed through the magnetizing loop. The induced flux in the ferrite now increases as represented by the hysteresis loop, and the ferrite again is magnetically saturated so that upon termination of the pulse it is again latched to the high flux density state indicated as state #1.

The signal coupling into and out of the strip transmission line of the phase shifter may be by way of coaxial lines, as illustrated in FIG. 4, one coaxial line comprising an outer conductor 20 and an inner conductor 25. The other coaxial line comprises an outer conductor 30 and an inner conductor 33. The outer conductors 20 and 30 are electrically connected to metal blocks 34 and 35, respectively. The ground planes 11 and 12 are supported by and electrically connected to the blocks 34 and 35. The ends of the center conductor 13 engage slits in the inner conductors 25 and 33 for support and electrical connection.

Another embodiment of the invention is shown in FIGS. 5, 6, 7 and 8. Referring to these figures, a double loop ferrite toroid 36 is positioned in a strip transmission line between the center conductor 37 and an upper ground plane 38. The ferrite body 36 comprises a center leg 39 which, with an outer leg 41 forms one toroid, and which, with another outer leg 42 forms a second toroid. The width of the center leg preferably is twice that of each outer leg.

In this example, the ground plane 38 comprises a permanent magnet 43 at the center with brass strips 44 and 46 at the sides. The center conductor 37 is a permanent magnet having a polarity that opposes that of magnet 43. Both magnets may be silver plated to reduce radio frequency losses.

A similar double loop toroid 47 having a center leg 48 and outer legs 49 and 51 is positioned between the center conductor 37 and a lower ground plane 52. The ground plane 52 comprises a permanent magnet 53 at the center with brass strips 54 and 55 at the sides. The polarity of magnet 53 opposes that of the center conductor magnet 37, and, like the other magnets, may be silver plated.

The permanent magnets produce a biasing flux flow down the center legs 39 and 48 of the double loop toroids as indicated by the dotted line arrows in FIGS. 5 and 7.

A conductor 56 is passed through the ferrite toroids to function as a magnetizing loop or coil as shown in FIG. 5. When a current pulse is passed through it in the direction indicated by the arrows on the conductor, for placing the phase shifter in condition for producing a phase shift, the current pulse produces a flux flow down the legs of the toroids in the direction indicated by the solid line arrows in FIG. 5. This flux flow down the center legs is in the same direction as the biasing flux flow.

As in the first embodiment described, the biasing magnetizing force supplied by the magnets preferably is equal to the coercive force of the ferrite toroids. The operation of this double loop toroid embodiment is the same as that of the single loop toroid embodiment as described in connection with FIG. 9. It will be noted that when the double loop toroids are latched up to high flux density, the flux flow is in only one direction in that part of the ferrite body (the center leg) that is in the radio frequency interaction region of the transmission line, the outer legs of the double loop toroid being substantially out of this region.

As illustrated in FIG. 8, the coupling into and out of the strip transmission line of the phase shifter may be by way of coaxial lines 61 and 62 the same as previously described with reference to FIG. 4.

The above-described single loop and double loop toroid embodiments may be modified by omitting the permanent magnets and the resulting magnetic biasing, and by operating the phase shifter in the manner illustrated in FIG. 10. In such modified phase shifters the magnets are replaced by brass or other conducting strips. For example, referring to FIG. 1, the entire ground plane 11 may be a single sheet of brass. Similarly, the ground plane 12 may be a single sheet of brass. The center conductor 13 may be of brass.

The operation of the unbiased phase shifters will now be described with reference to FIG. 10. Initially the ferrite is unmagnetized and no magnetizing force is being applied. To put the phase shifter in condition for maximum phase shift, a current pulse is passed through the magnetizing coil of sufficient amplitude to drive the ferrite substantially to magnetic saturation. In the example illustrated, it is assumed that the polarity of this current pulse is a polarity that produces a magnetizing force in the positive direction. The resulting induced flux as the magnetizing force increases follows the "virgin curve" 66. Upon termination of the current pulse, the induced flux goes to the remanence flux density which is indicated as state #1. This is a stable magnetic state, and the phase shifter will now produce the maximum phase shift in a signal passed through it.

To switch the phase shifter to its state of minimum phase shift, a current pulse of opposite polarity is passed through the magnetizing coil. This current pulse has an amplitude such that the magnetizing force (now negative) is equal to or approximately equal to the coercive force of the ferrite. Thus, the induced flux in the ferrite toroids is brought to zero, and upon termination of the current pulse it is still zero as indicated by the legend state #2. The phase shifter will now produce no phase shift in a signal passed through it other than the small phase shift produced by the transmission line characteristics. The phase shifter is now back to its original condition and may again be switched to its maximum phase shift condition.

The above-described embodiments comprise strip transmission lines having two ground planes. The invention also applies to embodiments in which the strip transmission line has only one ground plane, and, therefore, only one ferrite toroid, either single loop or double loop.

In describing the operation of our phase shifter embodiments, it has been assumed that the phase shifter is switched into condition for producing maximum phase shift. If desired, any of the embodiments may be switched into condition for a phase shift that is less than maximum by making the current pulse have an amplitude less than that required to drive the ferrite to saturation in one direction. From that condition, the phase shifter is switched to minimum phase shift (state (2) in a way that is similar to the way the phase shifter is switched to minimum phase shift from the maximum phase shift condition. Specifically, if a magnetic bias is being used, the phase shifter is switched to state #2 (FIG. 9) by applying a reverse polarity pulse of sufficient amplitude to drive the ferrite substantially to magnetic saturation in the other direction. If no magnetic bias is being used, the phase shifter is switched to state #2 (FIG. 10) by applying a reverse polarity pulse of such amplitude that the magnetizing force is approximately equal to the coercive force of the minor hysteresis loop corresponding to the smaller phase shift.

Figure 11:
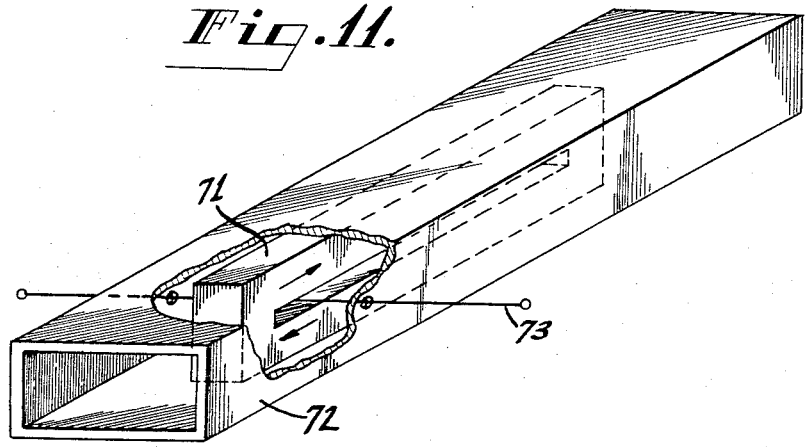
FIG. 11 is a perspective view of an embodiment of the invention in which a ferrite toroid is located in a waveguide.

Our invention is not limited to the use of a transmission line section of the strip transmission line type. For example, FIG. 11 shows an embodiment of the invention comprising a single loop ferrite toroid 71 in a rectangular waveguide 72. A conductor or loop 73 passes through openings in the sides of the waveguide and through the transverse opening of the ferrite toroid. To put the phase shifter in condition to shift phase, a pulse of current is passed through the conductor 73 which functions as a magnetizing coil or loop. This current pulse produces a magnetic flux longitudinally down one leg of the toroid and back along the other leg of the toroid as indicated by the arrows. The amplitude of the pulse (assuming maximum phase shift is desired) is sufficient to drive the ferrite to magnetic saturation. Upon termination of the pulse, the ferrite toroid is latched to high flux density at remanence, and a signal propagated through the waveguide in either direction will be phase shifted. The phase shifter is switched to its minimum phase shift condition by passing an opposite polarity current pulse through the conductor 73. The amplitude of this pulse is such as to produce a magnetizing force equal to the coercive force of the ferrite whereby the flux density in the ferrite is reduced to zero. These switching operations are the same as those previously described with reference to FIG. 10.

As stated in connection with the embodiment of FIGS. 1 to 4, the fact that the magnetic flux flow is in opposite directions in the two legs of the toroid 71 is not detrimental to the phase shift action because the phase shift produced in a signal travelling down the waveguide is the same regardless of the direction of the longitudinal flux flow.

Examples of suitable ferrites for the various embodiments of our phase shifter for use in the C band are types G1001, G1004 and G113 manufactured and sold by Trans-Tech, Inc., of Gaithersburg, Md. If the phase shifter is to be used in the X band, the Trans-Tech ferrite types TT1–390 and G1600, for example, are suitable.

Figure 12:
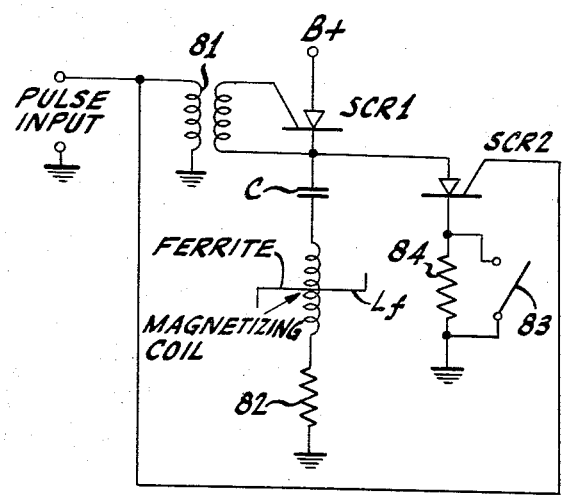
FIG. 12 is the circuit diagram of a suitable driver circuit for supplying pulse power to our improved phase shifter.

There are various suitable circuits for supplying the current pulses for switching the phase shifters into or out of condition for phase shifting. One suitable circuit is shown in FIG. 12. To put the phase shifter in condition for phase shifting, a single negative pulse at the pulse input is passed through a transformer 81 to turn on a silicon controlled rectifier SCR–1. This causes a pulse of current to flow from the B+ supply through SCR-1, through a capacitor C, through the magnetizing coil or loop of the phase shifter, and through a resistor 82 to ground. The resistor 82 provides damping which prevents oscillatory action. The ferrite element to be latched up is indicated at $L_f$. The voltage B+ and the circuit constants of capacitor C and of resistor 82 are selected so that the peak charging current is sufficient to bring the ferrite element $L_f$ to the desired magnetization.

The current pulse terminates when capacitor C is fully charged, and the ferrite element is latched up at high flux density. The ferrite element remains latched up until a positive pulse is applied at the pulse input.

A positive pulse at the pulse input turns on a silicon controlled rectifier SCR-2, thus discharging capacitor C. The resulting discharge current pulse flows in the reverse direction through the magnetizing coil. In the case of the phase shifters with magnetic bias, the circuit is operated with the switch 83 closed, and the current pulse drives the ferrite element $L_f$ to saturation in the direction opposite to the magnetization produced for the phase shift condition. At the termination of the discharge pulse, the ferrite element is brought to a condition of zero induced flux as described with reference to FIG. 9.

In the case of the phase shifters without magnetic bias, the circuit is operated with the switch 83 open so as to include a resistor 84 in the capacitor discharge circuit. The resistor 84 reduces the amplitude of the discharge current to a value that makes the magnetizing force approximately equal to the coercive force of the ferrite. Thus, the discharge pulse brings the ferrite to a condition of zero flux density as described with reference to FIG. 10.

Instead of using a pulse generating circuit, such as shown in FIG. 12, for switching the phase shifter, for some applications it may be switched by passing alternating current through the magnetizing loop. For example, a 60 cycle current may be passed through the magnetizing loop whereby one half cycle switches for a certain phase shift and the other half cycle switches for minimum phase shift, each half cycle corresponding to a current pulse.

The term "signal" as used in the description and claims includes radio frequency energy such as that used, for example, for heating purposes.

What is claimed is:

1. A phase shifter comprising
a transmission line,
a ferrite body positioned in said transmission line and extending in parallel relation to said transmission line,
means providing a closed magnetic path for magnetic flux that is caused to flow the length of said ferrite body,
means comprising a magnetizing loop which, when energized by a flow of current through said loop, causes a magnetic flux flow over said magnetic path and the length of said ferrite body to magnetize said body, the direction of said magnetization being substantially parallel to the length of said transmission line,
means for producing a pulse of current of a certain polarity through said loop to magnetize said ferrite body whereby said ferrite body is latched to a state of induced flux upon termination of said pulse,
and means for next producing through said loop a pulse of current of the opposite polarity and of such amplitude that upon termination of said opposite polarity pulse said ferrite body has approximately zero induced flux.

2. A phase shifter comprising
a transmision line,
a ferrite body positioned in said transmission line and extending in parallel relation to said transmission line for a length that is a function of the amount of phase shift desired,
means providing a closed magnetic path for magnetic flux that is caused to flow the length of said ferrite body,
means comprising a magnetizing loop which, when energized by a flow of current through said loop, causes a magnetic flux flow over said magnetic path and the length of said ferrite body to magnetize said body, the direction of said magnetization being substantially parallel to the length of said transmission line,
means for producing a pulse of current of a certain polarity through said loop of sufficient amplitude to magnetize said ferrite body whereby said ferrite body is latched to a remanent state upon termination of said pulse,
and means for next producing through said loop a pulse of current of the opposite polarity and of an amplitude that produces a magnetizing force approximately equal to the coercive force of said ferrite at said remanent state whereby upon termination of said opposite polarity pulse said ferrite body has approximately zero induced flux.

3. A phase shifter comprising a transmission line having a radio frequency interaction region when a signal is propagated down said line,
a ferrite body located within said region and extending in parallel relation to said transmission line for a length that is a function of the amount of phase shift desired,
means providing a closed magnetic path for magnetic flux that is caused to flow the length of said ferrite body,
means comprising a magnetizing loop for causing a magnetic flux flow over said magnetic path and the length of said ferrite body to magnetize said body in response to a flow of current through said magnetizing loop, the direction of said magnetization being substantially parallel to the length of said transmission line, and means including at least one permanent magnet for applying to said ferrite body a biasing magnetizing force parallel to the length of said transmission line and in said direction of said magnetization.

4. A phase shifter comprising
a transmission line having a radio frequency interaction region when a signal is propagated down said line,
a body of ferrite located within said region and extending in parallel relation to said transmission line for a length that is a function of the amount of phase shift desired,
means providing a closed magnetic path for magnetic flux that is caused to flow the length of said ferrite,
means comprising a magnetizing loop which, when energized by a flow of current through said loop, causes a magnetic flux flow over said magnetic path and the length of said ferrite to magnetize said ferrite, the direction of said magnetization being substantially parallel to the length of said transmission line,
means including at least one permanent magnet for applying to said ferrite body a biasing magnetizing force parallel to the length of said transmission line and in said direction of said magnetization,
means for producing through said loop a pulse of current of a polarity that produces a magnetizing force in the same direction as said biasing force and of sufficient amplitude to magnetize said ferrite to a desired magnetization whereby, upon termination of said pulse, said ferrite is latched to a state of high induced flux density,
said biasing force having a value approximately equal to the coercive force of the ferrite,
and means for next producing a pulse of current of the opposite polarity and of sufficient amplitude to magnetize said ferrite body substantially into magnetic saturation in the other direction whereby upon termination of said opposite polarity pulse said ferrite body has approximately zero induced flux.

5. A phase shifter comprising
a transmission line having a radio frequency interaction region when a signal is propagated down said line,
a body of ferrite located within said region and extending in parallel relation to said transmission line for a length that is a function of the amount of phase shift desired,
means providing a closed magnetic path for magnetic flux that is caused to flow the length of said ferrite,
means comprising a magnetizing loop which, when energized by a flow of current through said loop, causes a magnetic flux flow over said magnetic path and the length of said ferrite to magnetize said ferrite, the direction of said magnetization being substantially parallel to the length of said transmission line,
means for applying to said ferrite a biasing magnetizing force that is at least approximately equal to the coercive force of said ferrite,
means for producing through said loop a pulse of current of a polarity that produces a magnetizing force in the same direction as said biasing force and of sufficient amplitude whereby, upon termination of said pulse, said ferrite body is latched to a state of high induced flux which is higher than remanence due to the bias magnetizing force,
and means for next producing through said loop a pulse of current of the opposite polarity and of sufficient amplitude to magnetize said ferrite body at least approximately to magnetic saturation in the other direction whereby upon termination of said opposite polarity pulse said ferrite body has approximately zero induced flux.

References Cited

UNITED STATES PATENTS

| 3,051,917 | 8/1962 | Gyorgy et al. | 333—31 |
| 3,277,401 | 10/1966 | Stern | 333—24.1 |

OTHER REFERENCES

Treuhaft et al., Preceedings of the IRE, August 1958, p. 1538 (TK 5700 17).

HERMAN KARL SAALBACH, *Primary Examiner.*

ELI LIEBERMAN, *Examiner.*

P. L. GENSLER, *Assistant Examiner.*